United States Patent
Richter (10) Patent No.: US 8,689,936 B2
(45) Date of Patent: Apr. 8, 2014

(54) ACOUSTIC ABSORBER HAVING CONICAL INSERTS

(71) Applicant: Rolls-Royce Deutschland Ltd & Co KG, Blankenfelde-Mahlow (DE)

(72) Inventor: Christoph Richter, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 0 days.

(21) Appl. No.: 13/711,150

(22) Filed: Dec. 11, 2012

(65) Prior Publication Data

US 2013/0186707 A1 Jul. 25, 2013

(30) Foreign Application Priority Data

Dec. 13, 2011 (DE) .................... 10 2011 120 979

(51) Int. Cl.
*E04B 1/82* (2006.01)
(52) U.S. Cl.
USPC .............. 181/292; 181/284; 52/144; 52/145
(58) Field of Classification Search
USPC .............................. 181/292, 284; 52/144, 145
See application file for complete search history.

(56) References Cited

U.S. PATENT DOCUMENTS

| | | | | | |
|---|---|---|---|---|---|
| 3,819,007 | A | * | 6/1974 | Wirt et al. ................. | 181/286 |
| 3,831,710 | A | * | 8/1974 | Wirt ........................... | 181/286 |
| 3,887,031 | A | * | 6/1975 | Wirt ........................... | 181/286 |
| 4,035,535 | A | * | 7/1977 | Taylor ....................... | 428/116 |
| 4,106,587 | A | * | 8/1978 | Nash et al. ................. | 181/213 |
| 4,231,447 | A | * | 11/1980 | Chapman ..................... | 181/213 |
| 4,298,090 | A | | 11/1981 | Chapman | |
| 5,445,861 | A | * | 8/1995 | Newton et al. ............... | 428/116 |
| 5,670,758 | A | | 9/1997 | Borchers et al. | |
| 6,125,965 | A | * | 10/2000 | Wang ......................... | 181/286 |
| 7,819,224 | B2 | * | 10/2010 | Borchers et al. ............. | 181/292 |

FOREIGN PATENT DOCUMENTS

| | | |
|---|---|---|
| DE | 2402877 | 7/1974 |
| DE | 2604692 | 8/1976 |
| DE | 2950930 | 7/1980 |
| DE | 19607290 | 10/1996 |

(Continued)

OTHER PUBLICATIONS

Wikipedia: Gewebe Version vom Nov. 30, 2011. [Recherchiert am Oct. 5, 2012]. Im Internet: <URL:http://de.wikipedia.org/w/index.php?title=Gewebe_%28Textil%29&oldid=98572467>. English Machine Translation: Wikipedia: Fabric. Version of Nov. 30, 2011. [Researched on Oct. 5, 2012]. On Internet: <URL:http://de.wikipedia.org/w/index.php?title=Gewebe_%28Textil%29%oldid=96572467>.

(Continued)

*Primary Examiner* — Forrest M Phillips
(74) *Attorney, Agent, or Firm* — Timothy J. Klima; Shuttleworth & Ingersoll, PLC (57) ABSTRACT

An acoustic absorber includes a wall provided with a plurality of apertures as well as a substantially non-perforated second wall, with the first wall and the second wall being spacedly arranged to one another, and at least one honeycomb structure being provided between the walls, with the honeycomb structure having a substantially cylindrical recess in at least one area, with a funnel element opening to the first and second walls being provided in the recess, and having a height greater than the distance of the walls, with the second wall being designed pot-like in the area of the funnel element.

14 Claims, 6 Drawing Sheets

(56) References Cited

FOREIGN PATENT DOCUMENTS

| DE | 102004040112 | 3/2005 |
|---|---|---|
| GB | 2005384 | 4/1979 |
| GB | 2300081 | 10/1996 |

OTHER PUBLICATIONS

Wikipedia: Spritzgießen. Version vom Nov. 30, 2011. [Recherchiert am Oct. 9, 2012]. Im Internet: <URL:http://de.wikipedia.org/w/index.php?title=Spritzgie%C3%Fen&oldid=96595802>. English Machine Translation: Wikipedia: Injection. Version of Nov. 30, 2011. [Researched on Oct. 9, 2012]. On Internet <URL:http://de.wikipedia.org/w/index.php?title=Spritzgie%C3%9Fen%oldid=96595802>.

Wikipedia: Tiefziehen. Version vom Dec. 8, 2011. [Recherchiert am Oct. 9, 2012]. Im Internet: <URL:http//de.wikipedia.org/w/index.php?title=Tieziehen&oldid=96871512>.English Machine Translation: Wikipedia: Deep drawing. Version of Dec. 8, 2011. [Researched on Oct. 9, 2012]. On Internet: <URL:http://de.wikipedia.org/w/index.php?Tiefziehen&oldid?96871512>.

German Search Report dated Oct. 9, 2012 from related application.

* cited by examiner

ACOUSTIC ABSORBER HAVING CONICAL INSERTS

This application claims priority to German Patent Application 102011120979.8 filed Dec. 13, 2011, the entirety of which is incorporated by reference herein.

This invention relates to a substantially plate-shaped or cylindrical or conical acoustic absorber which can be used for damping varying sound frequencies, in particular in an aircraft gas-turbine engine.

It is known from the state of the art to achieve noise damping either by using a Helmholtz resonator or by designing the latter as a damper according to the $\lambda/4$ principle.

The state of the art shows in this connection pot-like damping elements provided with a horn or cone, as for example described in U.S. Pat. No. 5,760,349. A further example for an absorber of this type is shown by U.S. Pat. No. 5,670,758. These publications show so-called SAAs (special acoustic absorbers), which on the one hand require a large amount of space and on the other hand are expensive to manufacture. In particular, it must be taken into account here that the open horn or cone elements shown have a complex structure and must be inserted into a substantially cylindrical casing element which is closed at the rear. According to the state of the art, the SAAs assume no structural tasks whatsoever and must be integrated into an appropriate supporting structure, resulting in large gaps and clearances between the individual absorbers.

The state of the art furthermore shows so-called SDOF or DDOF absorbers (single degree of freedom and double degree of freedom, respectively). As an example for this, DE 10 2004 053 383 A1 is cited. This publication shows a honeycomb structure which is designed in the manner of honeycombs of hexagonal elements covered by a perforated wall. These absorbers are designed for damping in accordance with the $\lambda/4$ principle.

The absorbers acting according to the $\lambda/4$ principle damp substantially higher frequencies, while the SAAs are suitable for damping both lower and higher frequencies, thanks to their structure with two separate chambers (two degrees of freedom).

The object underlying the present invention is to provide an acoustic absorber, which while being simply designed and cost-effectively producible enables a good damping behaviour over a large frequency range and avoids the disadvantages of the state of the art.

It is a particular object of the present invention to provide solution to the above problem by a combination of the features of described herein. Further advantageous embodiments of the invention will become apparent from the present description.

The invention provides an acoustic absorber which combines the two basic principles known from the state of the art in a simple manner. SAAs are combined here with SDOF or DDOF absorbers. In this connection, it is provided in accordance with the invention that a honeycomb structure is arranged between a first and a second wall, the first wall being provided with a plurality of apertures and hence perforated. The first wall can be designed in a favourable embodiment of the invention as a perforated plate, as a plate with micro-perforations or also as a mesh. The sound waves can thus penetrate into the individual chambers of the honeycomb structure and are damped there in accordance with the $\lambda/4$ principle.

SAAs are additionally provided at suitable points. They can be made very simply and inexpensively using the design in accordance with the invention, since it is only necessary in accordance with the invention to make a substantially cylindrical recess in the honeycomb structure, for example by milling or drilling. The walls of the honeycomb structure thus form a casing element into which a funnel element in accordance with the Helmholtz principle can be inserted.

In order to provide in the absorber in accordance with the invention sufficient depth for attaining the upper absorption frequency of the SAA, the second wall in the area of the horn or cone element is designed pot-shaped. This is necessary so that the upper frequency with maximum absorption for the SAA can be precisely adjusted to a frequency at which the surrounding SDOF attains its maximum absorption. A pot-shaped cone or horn design of this type is easily and cost-effectively producible.

In accordance with the invention, the pot-shaped design can be dispensed with. The result is a broader-band absorption response with a reduced maximum absorption.

It is thus possible in accordance with the invention to provide a large proportion of the acoustic absorber surface with the honeycomb structure and to selectively install individual SAAs. The entire surface of the acoustic absorber can thus be used advantageously for acoustic damping. The result in accordance with the invention is an optimization of the surface use.

In accordance with the invention, the funnel element is made as a separate component. In a preferred embodiment, it has a flange which can contact the inside of the perforated first wall and be fastened thereto or inside a recess in the honeycomb structure before the perforated outer wall is attached. By appropriate selection of the width of the flange, it is possible to cover with it all the partially split-open honeycombs of the honeycomb structure such that an optimization of the damping response or absorption response is achieved and the operation of the honeycomb structure is preserved in optimum manner.

Due to the pot-like embodiment of the second wall, which can be achieved by means of a deep-drawing process or in similar manner, a sufficient chamber volume of the SAAs is provided which can be optimized with regard to the frequency to be damped.

In accordance with the invention, a large effective absorber surface is thus provided, since the acoustic absorber in accordance with the invention has smaller unused surface areas than is the case in the state of the art which is known to be disadvantageous.

The acoustic absorber in accordance with the invention can be used in particular for damping in the area of the combustion chamber and the turbine of a gas-turbine engine.

In a favourable embodiment of the invention, it is possible to improve the mode of operation of the SAA in that the adjacent honeycombs which are cut or split open and are not needed for absorption with regard to the required volume are filled, for example by a plastic material. Alternatively, it is also advantageous in accordance with the invention to insert into the substantially cylindrical recess or milled/drilled hole of the honeycomb structure a tube-like insert element which optimizes the damping volume of the SAA.

In an extension of the principle of the invention, the recess in the honeycomb structure can also be replaced by a honeycomb structure with enlarged cells. The funnel elements can in accordance with the invention also be designed in this case as a continuous plate with holes as the funnel apertures. The pot-shaped design of the rear wall is not necessary in this case and is dispensed with.

For use in aircraft engines, the possibility of draining off liquids which penetrate through the perforated plate is a very crucial safety-relevant element in absorbers. This is done in accordance with the state of the art usually through circumferential slots in the walls of the honeycombs, allowing liquids to run off from cell to cell. In the upper area, where the perforated wall is facing downwards, the liquid can normally drain off again through the perforated wall and no drainage slots are required. The liquids are collected and drained off at the lowest point in accordance with the state of the art.

This principle can also be applied for the combined absorber in accordance with the present invention. The wall of the horn or cone can create a space, in the upper area as well in which liquids might collect. The honeycomb structure is in accordance with the invention therefore provided with drainage slots on the downward facing side. This simple principle for drainage can be applied to all previously mentioned variants of the invention. Drainage of the lower pot-shaped elements is achieved via small holes on the bottom of these.

The present invention is described in the following in light of the accompanying drawing showing exemplary embodiments. In the drawing.

Figure 1:
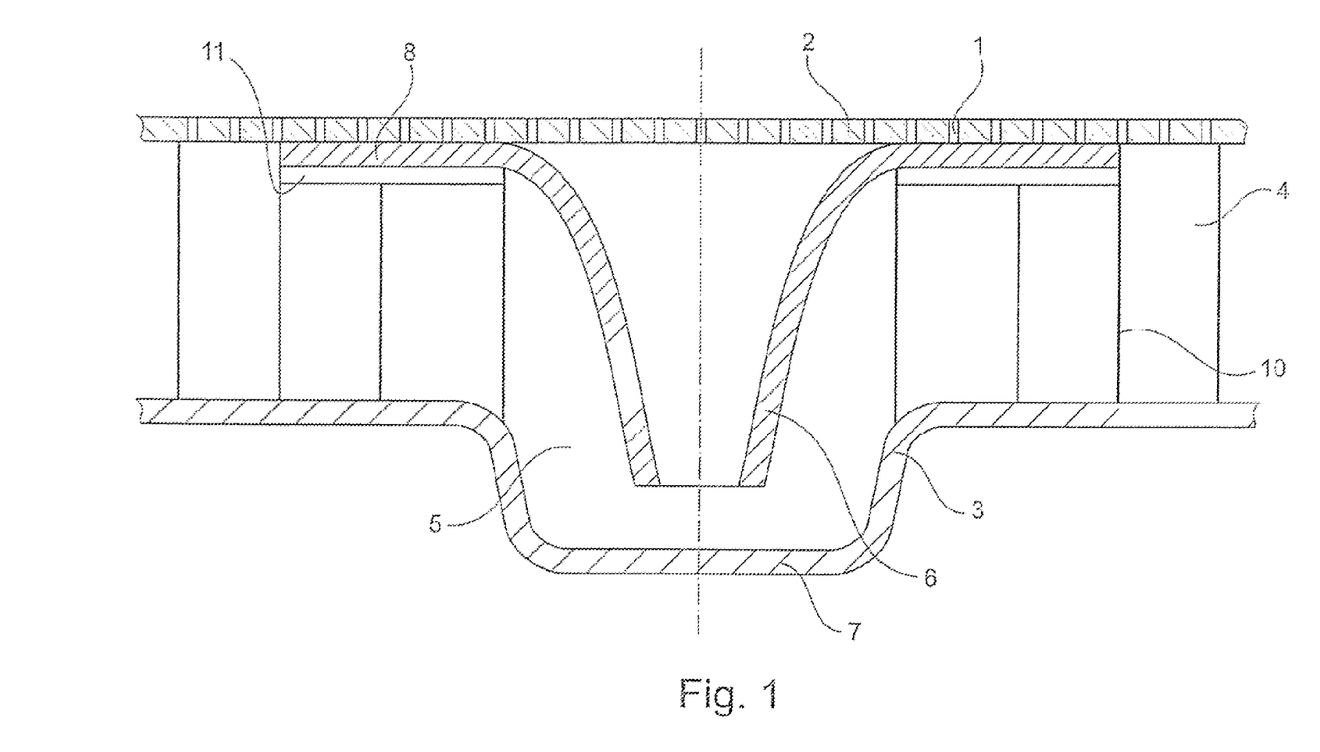
FIG. 1 shows a schematic simplified sectional view of the acoustic absorber in accordance with the present invention.

The acoustic absorber in accordance with the invention includes a first wall 2 provided with a plurality of apertures or recesses 1. The first wall 2 can be designed in the form of a perforated or micro-perforated plate. The first wall 2 can also be designed as a mesh, for example a wire mesh. The apertures 1 permit the entry of sound waves into a honeycomb structure 4 arranged on the first wall 2 at the rear. This structure includes a plurality of walls 10, which are made from a metallic material, for example, and form a honeycomb-like overall structure. It is self-evident that other geometries of the honeycomb structure 4 are also possible within the scope of the invention.

A non-perforated second wall 3 is arranged on the inside of the honeycomb structure 4 and connected thereto. This results in a sandwich-like overall design.

Figure 2:
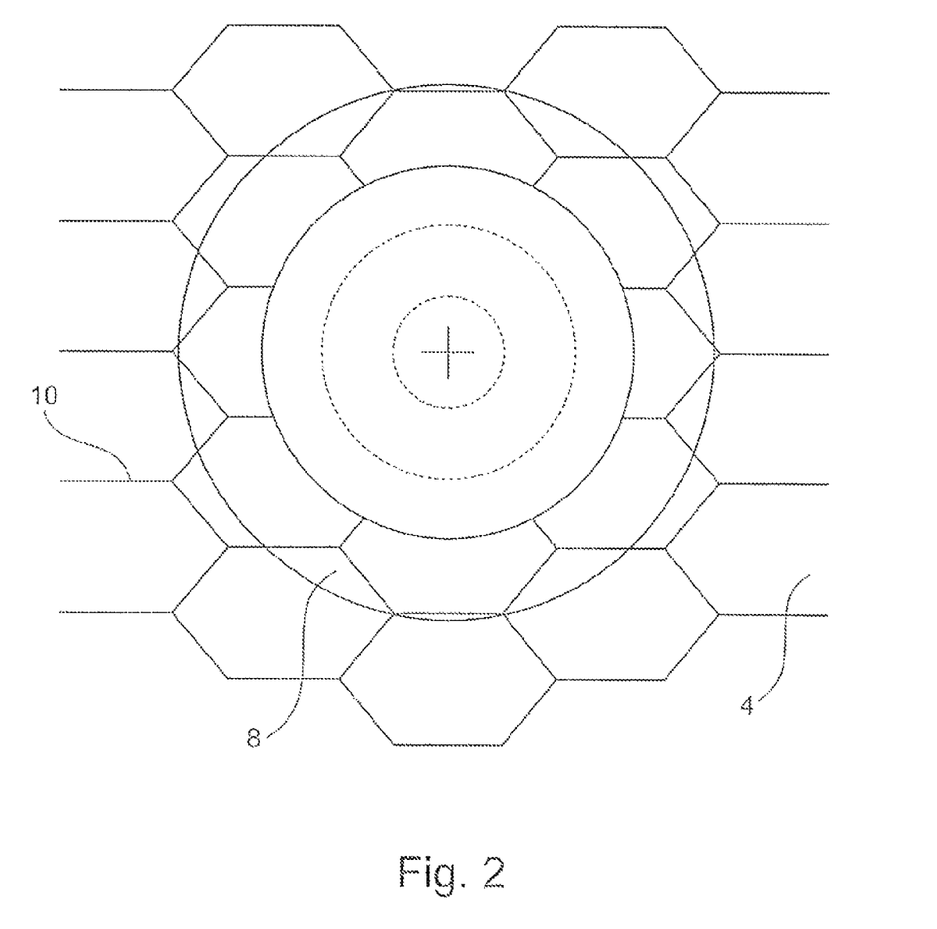
FIG. 2 shows a simplified top view onto the arrangement shown in FIG. 1.

At selected points, a substantially cylindrical recess 5 is provided in the honeycomb structure, for example by milling or drilling, before attachment of the first wall 2. Inside the recess 5 is arranged a funnel element 6 which is open on both sides and has an annular flange 8 facing the first wall 2. The flange 8 is connected to the first wall 2 in order to fix the conical or horn element 6. The conical or horn element 6 has a height which is greater than the height of the honeycomb structure 4 and the distance between the first wall 2 and the second wall 3. To provide a sufficient damping volume, the second wall 3 has a pot-like bulge 7 as shown in FIG. 1 in the area of the funnel element FIG. 2 shows a top view onto the arrangement of FIG. 1. When viewed together with FIG. 1, it is clear that the honeycomb structure 4 is provided with an annular recess 11 for arranging the flange 8. The diameter of the flange 8 and the width of the flange 8 are dimensioned such that all cut or split-open honeycombs of the honeycomb structure 4 are covered by the flange 8.

Figure 3:
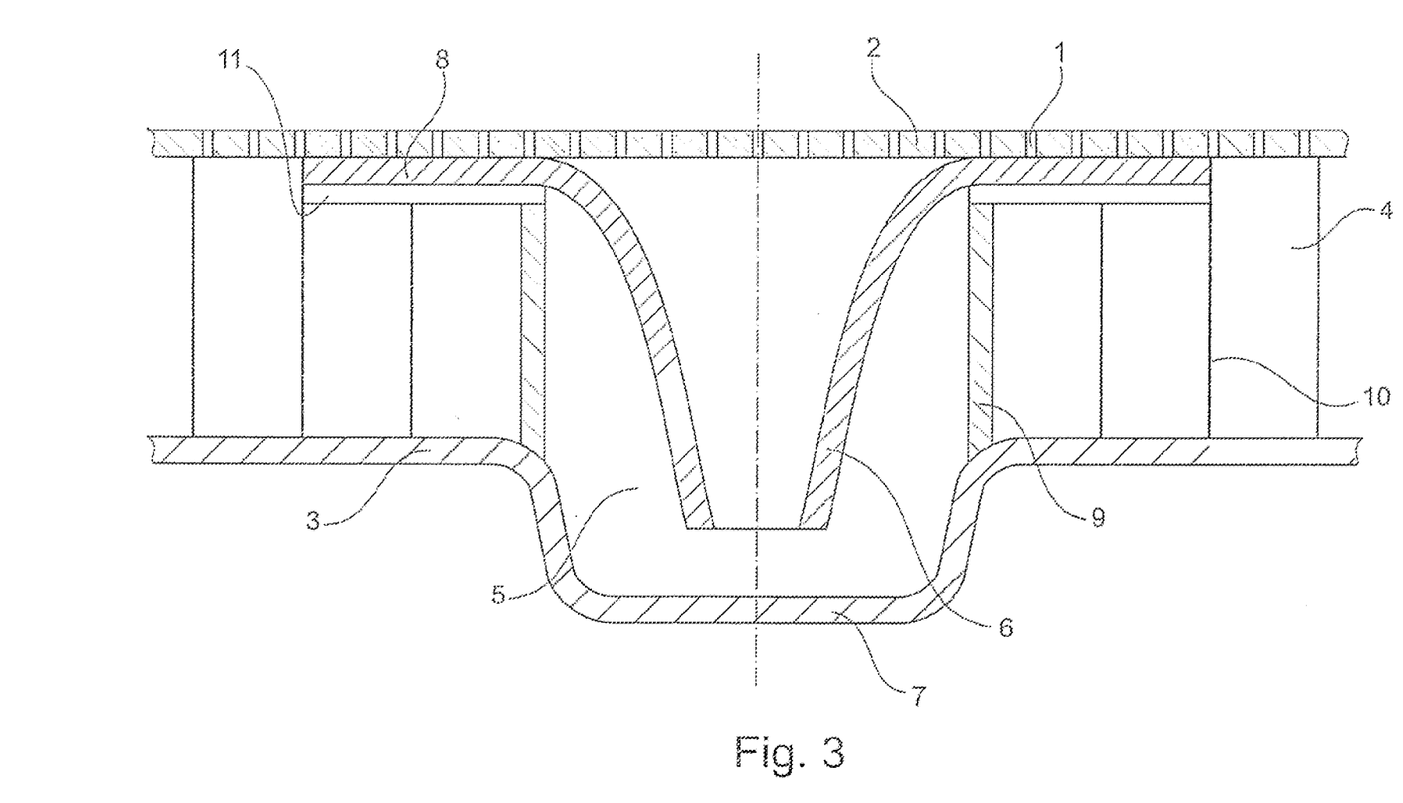
FIG. 3 shows a further exemplary embodiment of the absorber in accordance with the present invention.

For optimization of the damping volume of the SAA formed by the conical or horn element 6, it can be advantageous in a favourable embodiment of the invention to insert a tube-like insert element 9 into the recess 5, as is shown in FIG. 3.

In accordance with the invention, the result is thus an optimization of the surface area of the acoustic absorber usable for sound damping or sound absorption.

It is also possible in accordance with the invention to arrange several honeycomb structures 4 above one another which have different chamber volumes and are hence optimized for damping different frequencies.

Figure 4:
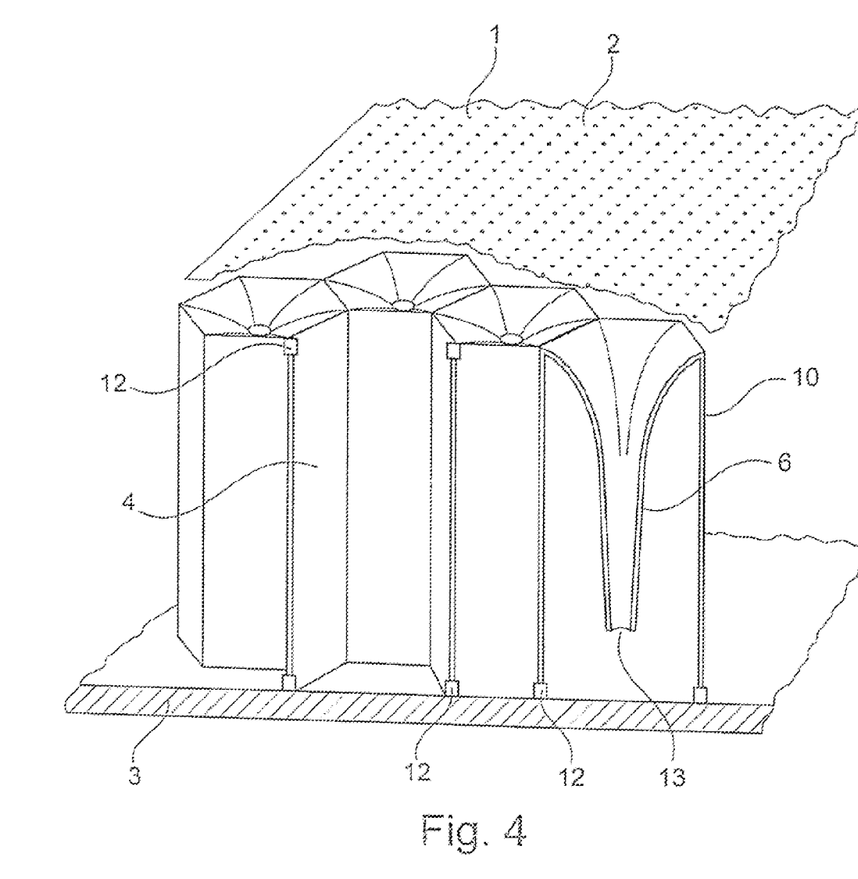
FIG. 4 shows a perspective simplified partial view of a further exemplary embodiment.
Figure 5:
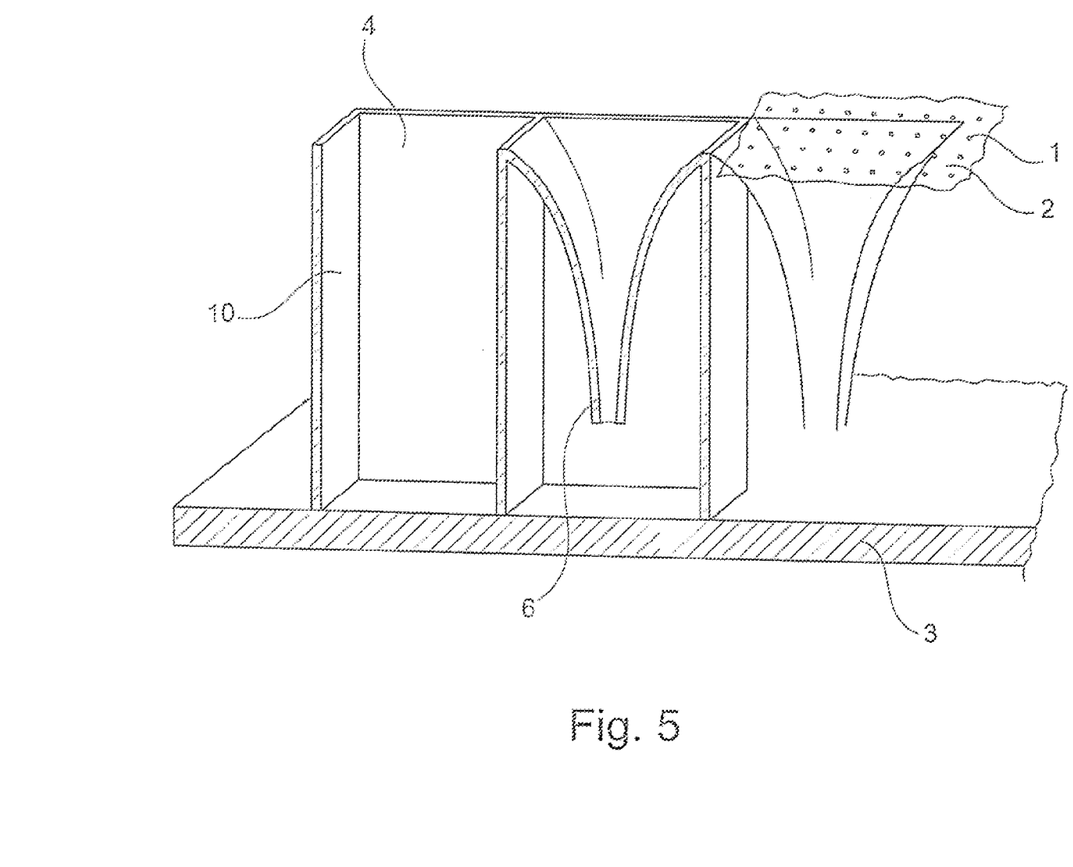
FIG. 5 shows a view of a further exemplary embodiment.

FIGS. 4 and 5 show further exemplary embodiments of the acoustic absorber in accordance with the invention. In each of the two embodiments, the honeycomb structure 4 is dimensioned such that a single honeycomb has a sufficiently large interior for receiving a conical or horn shaped element 6. In the exemplary embodiment in FIG. 4, the honeycombs are designed hexagonal, while in the embodiment in FIG. 5 a honeycomb structure is provided that has square honeycombs.

The exemplary embodiment of FIG. 4 furthermore shows at the upper or lower area of the walls 10 of the honeycomb elements 4 drainage recesses 12 which are used to drain off liquid which has entered.

In all other respects, the design of the exemplary embodiments shown in FIGS. 4 and 5 matches the design of the embodiments in FIGS. 1 to 3, where identical parts are provided with the same reference numerals.

Particularly favourable dimensions for the acoustic absorber in accordance with the invention can be as follows:
diameter of recess 5: 30 to 40 mm, preferably 40 mm;
external diameter of the opening of the conical or horn shaped element 6 at the upper end area facing the first wall 2: 30 to 40 mm, preferably 35 mm;
external diameter of the funnel of the funnel element 6 at the lower end area facing the second wall 3: 3 to 20 mm, preferably 6 mm;
overall height of the SAA, incl. the pot-like recess 5 shown in FIGS. 1 and 2: 20 to 100 mm, preferably 85 mm;
height of the remaining gap between the lower end of the funnel element 6 facing the second wall 3 and the second wall 3: 1 to 10 mm, preferably 6 mm;

The adjacent honeycomb structure not provided with funnel elements 6 preferably has an overall height between 40 and 50 mm. The first wall 2 with the apertures 1 is the same in all areas, both in the area of the SAAs and in the area of the SDOF or DDOF absorbers.

Figure 6:
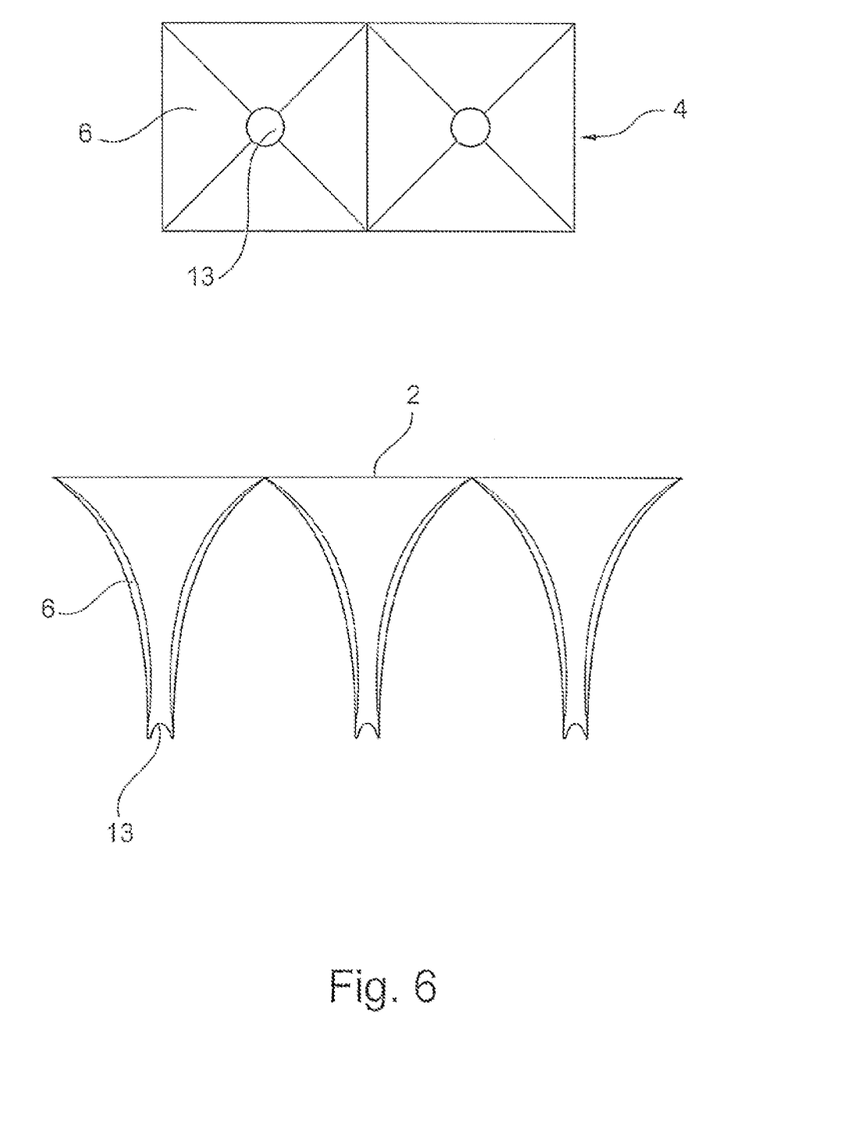
FIG. 6 shows a simplified partial top view as well as a simplified partial side view of the exemplary embodiment shown in FIG. 5.

FIG. 6 shows a top view and a simplified side view onto the exemplary embodiment shown in FIG. 5. It is clear here that the funnel elements 6 are each arranged in square honeycombs of the honeycomb structure 4. The reference numeral 13 shows a centric recess of the funnel elements 6.

LIST OF REFERENCE NUMERALS

1 Aperture
2 First wall
3 Second wall
4 Honeycomb structure
5 Recess
6 Conical or horn shaped element
7 Pot
8 Flange
9 Insert element
10 Wall
11 Annular recess 12 Drainage recess
13 Centric recess

What is claimed is:

1. An acoustic absorber including:
a first wall including a plurality of apertures;
a substantially non-perforated second wall, with the first wall and the second wall being spacedly arranged to one another, and
at least one honeycomb structure being provided between the first and second walls, the honeycomb structure including:
a substantially cylindrical recess in at least one area;
a shaped element having at least one chosen from a conical and a horn shape opening to the first and second walls being provided in the substantially cylindrical recess, and having a height greater than a distance between the first and second walls;
the second wall shaped pot-like in an area of the shaped element with an interior of the pot-like shaped portion facing the shaped element and receiving a portion of the shaped element to accommodate the greater height of the shaped element.

2. The acoustic absorber in accordance with claim 1, wherein the shaped element includes a flange which contacts an inside of the first wall.

3. The acoustic absorber in accordance with claim 2, wherein the shaped element is attached to the first wall by the flange.

4. The acoustic absorber in accordance with claim 2, wherein the flange is non-perforated.

5. The acoustic absorber in accordance with claim 1, wherein the first wall is formed as at least one chosen from a perforated plate, a micro-perforated plate and a mesh.

6. The acoustic absorber in accordance with claim 1, wherein open honeycombs adjacent to the substantially cylindrical recess of the honeycomb structure are at least partially filled for forming the substantially cylindrical recess.

7. The acoustic absorber in accordance with claim 1, wherein in the substantially cylindrical recess of the honeycomb structure a tube-like insert element is arranged for forming a cylindrical wall.

8. The acoustic absorber in accordance with claim 1, wherein a plurality of shaped elements are provided in even geometrical arrangement.

9. The acoustic absorber in accordance with claim 1, wherein a plurality of shaped elements are provided in uneven geometrical arrangement in accordance with sound waves applied to the absorber.

10. The acoustic absorber in accordance with claim 1, wherein the substantially cylindrical recess of the honeycomb structure is formed by a honeycomb structure including a plurality of individual cells having diameters sufficiently large to each accept a shaped element.

11. The acoustic absorber in accordance with claim 1, wherein the honeycomb structure on a bottom side relative to an installation position of the absorber is provided with circumferential drainage slots.

12. The acoustic absorber in accordance with claim 1, wherein the honeycomb structure is provided with circumferential drainage slots on both a flow-facing side and a rear side.

13. The acoustic absorber absorber in accordance with claim 1 in an aircraft gas-turbine engine.

14. An acoustic absorber including:
a first wall including a plurality of apertures;
a substantially non-perforated second wall, with the first wall and the second wall being spacedly arranged to one another, and
at least one honeycomb structure being provided between the first and second walls, the honeycomb structure including:
a substantially cylindrical recess in at least one area;
a shaped element having at least one chosen from a conical and a horn shape opening to the first and second walls being provided in the substantially cylindrical recess, and having a height greater than a distance between the first and second walls;
the second wall shaped pot-like in an area of the shaped element to receive a portion of the shaped element and accommodate the greater height of the shaped element;
wherein open honeycombs adjacent to the substantially cylindrical recess of the honeycomb structure are at least partially filled for forming the substantially cylindrical recess.

* * * * *